United States Patent
Misoka

(10) Patent No.: US 9,429,933 B2
(45) Date of Patent: Aug. 30, 2016

(54) NUMERICAL CONTROLLER FOR MACHINE HAVING COMPONENT INSPECTION TIMING NOTIFICATION FUNCTION

(71) Applicant: FANUC Corporation, Minamitsuru-gun, Yamanashi (JP)

(72) Inventor: Hideaki Misoka, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 317 days.

(21) Appl. No.: 14/197,606

(22) Filed: Mar. 5, 2014

(65) Prior Publication Data

US 2014/0257530 A1 Sep. 11, 2014

(30) Foreign Application Priority Data

Mar. 7, 2013 (JP) ................................. 2013-045594

(51) Int. Cl.
*G05B 19/406* (2006.01)
(52) U.S. Cl.
CPC ... *G05B 19/406* (2013.01); *G05B 2219/32234* (2013.01)
(58) Field of Classification Search
CPC ................. G05B 19/406; G05B 2219/32234
See application file for complete search history.

(56) References Cited

U.S. PATENT DOCUMENTS

| | | | | | |
|---|---|---|---|---|---|
| 5,093,794 | A * | 3/1992 | Howie | .................... | G06Q 10/06 700/100 |
| 5,581,486 | A * | 12/1996 | Terada | ..................... | G07C 3/00 700/174 |
| 6,075,358 | A * | 6/2000 | Hetzel | .................... | G01R 31/01 324/757.04 |
| 6,240,202 | B1 * | 5/2001 | Yokoyama | ......... | G01N 21/8851 382/149 |
| 2003/0045946 | A1 * | 3/2003 | Hattori | ............... | G05B 23/0264 700/27 |
| 2004/0064351 | A1 * | 4/2004 | Mikurak | .............. | G06Q 10/087 705/22 |
| 2004/0208353 | A1 * | 10/2004 | Murakami | ........... | G01N 21/956 382/145 |
| 2006/0294312 | A1 * | 12/2006 | Walmsley | ............. | H04L 9/0662 711/122 |
| 2009/0018694 | A1 * | 1/2009 | Stammen | ................ | B24B 49/00 700/175 |
| 2009/0322510 | A1 * | 12/2009 | Berger | .................. | H04W 60/00 340/539.1 |
| 2010/0057512 | A1 * | 3/2010 | Tays | ....................... | G06Q 10/06 705/7.15 |

FOREIGN PATENT DOCUMENTS

DE 10 2006 019 135 A1 11/2007
JP H02-173803 A 7/1990

(Continued)

OTHER PUBLICATIONS

Decision to Grant a Patent issued Dec. 16, 2014 in corresponding Japanese Patent Application No. 2013-045594 (3 pages) with English Translation (3 pages).

(Continued)

*Primary Examiner* — Ramesh Patel
(74) *Attorney, Agent, or Firm* — Drinker Biddle & Reath LLP

(57) ABSTRACT

A numerical controller for a machine tool has a component inspection timing notification function for notifying a user of the timing for inspection of each individual component used in the machine tool. The numerical controller reads an inspection cycle, acquires the date of inspection and state quantity of the component, and calculates an amount of change in state quantity. If the amount of change in state quantity is larger than a predetermined threshold, the inspection cycle is changed. If not, the next inspection date is calculated based on the last inspection date and the inspection cycle. Then, the next inspection date is notified.

3 Claims, 7 Drawing Sheets

(56) References Cited

FOREIGN PATENT DOCUMENTS

| JP | H02-234298 A | 9/1990 |
| JP | H0397009 | 4/1991 |
| JP | H0751996 | 2/1995 |
| JP | H07219622 A | 8/1995 |
| JP | H10-320031 A | 12/1998 |
| JP | 2003-069731 A | 3/2003 |
| JP | 2004-334507 A | 11/2004 |
| JP | 2008178926 A | 8/2008 |
| JP | 2009-294702 | 12/2009 |

OTHER PUBLICATIONS

Office Action issued Dec. 7, 2015 in German Patent Application No. 10 2014 003 204.3 (9 pages) with an English Translation (4 pages).

* cited by examiner

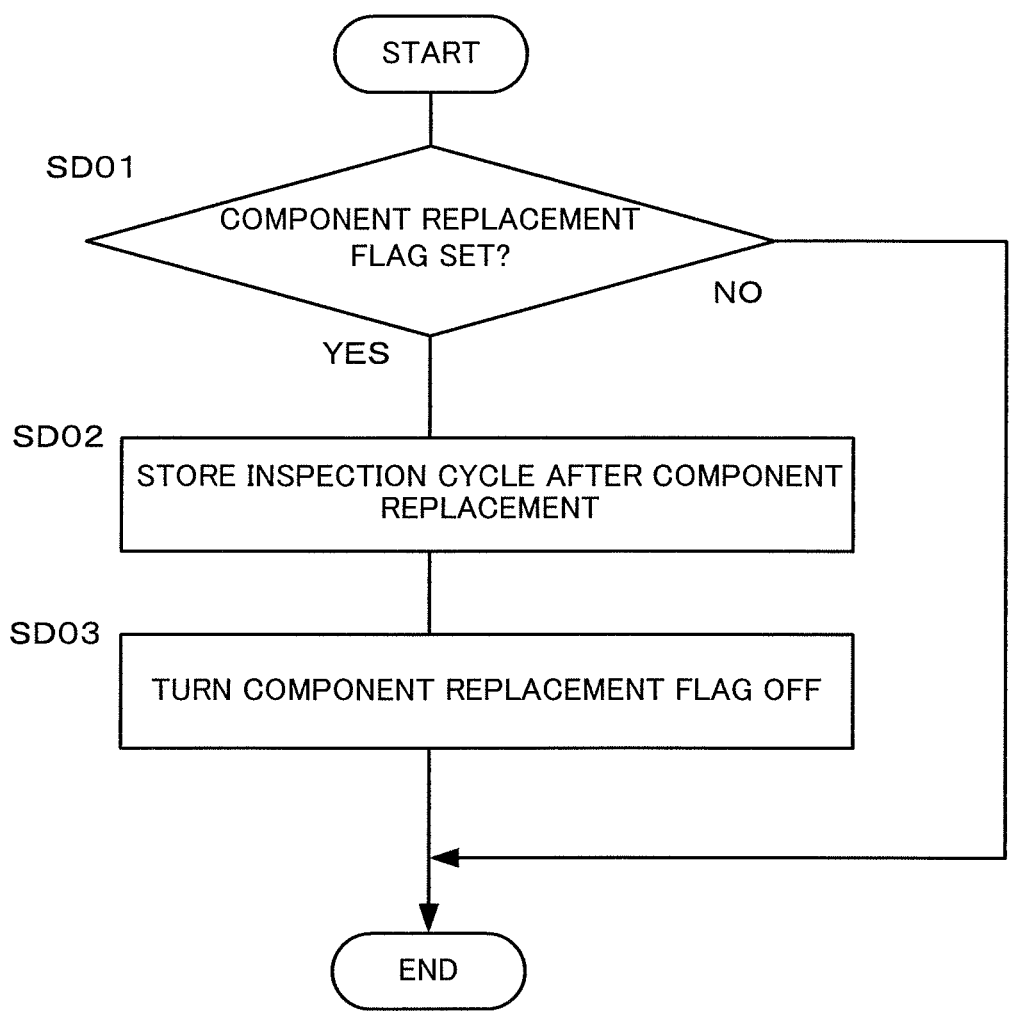

NUMERICAL CONTROLLER FOR MACHINE HAVING COMPONENT INSPECTION TIMING NOTIFICATION FUNCTION

RELATED APPLICATION DATA

This application claims priority under 35 U.S.C. §119 and/or §365 to Japanese Application No. 2013-045594 filed Mar. 7, 2013, the entire contents is incorporated herein by reference.

BACKGROUND OF THE INVENTION

1. Field of the Invention

The present invention relates to a numerical controller for controlling a machine, such as a machine tool or industrial machine, and more particularly, to a numerical controller for a machine having a component inspection timing notification function capable of notifying a user of the timing for component inspection.

2. Description of the Related Art

Machines, such as machine tools and industrial machines, use a large number of components that require periodic inspections and should be replaced immediately if their life is determined to be exhausted. However, it is difficult to control inspection timings for all the components. There are some techniques to overcome this. A machine maintenance inspection guide described in Japanese Patent Application Laid-Open No. 2-173803 is used to notify a user of the necessity of component inspection when reference values for inspection are exceeded by integrated values of the operating time of machine and frequency of machine usage. Further, an equipment inspection guide display method described in Japanese Patent Application Laid-Open No. 10-320031 and a maintenance management device and system for a machine tool described in Japanese Patent Application Laid-Open No. 2004-334507 are techniques for determining the next scheduled date of inspection based on a predetermined inspection cycle and notifying a user of it. If notified of the necessity of inspection, a user measures state quantities (voltage, insulation resistance value, deformation, frequency, etc.) for the determination of the life of a component. If reference values for the determination of the component life are exceeded by the measured values, the component life is determined to be exhausted and the component is replaced with a new one.

However, the prior art techniques have the following problems.

A "first problem" is that the component inspection is performed periodically. Some of the state quantities measured during the inspection do not change at a constant rate. If the component is a brand-new one, some state quantities change gradually at first and then drastically after continuous use for a fixed period of time. If the inspection cycle is fixed, the determination of the component life based on these state quantities is subject to the following problems.

First, in a period during which the state quantities gradually change, the inspection is repeated in vain despite the scarcity of the change if the inspection cycle is short. In a period during which the state quantities drastically change, in contrast, the component life may be exhausted before the inspection is performed if the inspection cycle is long. To avoid this, in this case, reference values possibly must be set at which a serviceable component is unduly determined to be exhausted. Thus, it is inefficient to periodically perform the component inspection.

A "second problem" is that it may not be efficient to perform the component inspection immediately after a user is notified of the necessity of the inspection. Machining of products by means of a machine tool requires a plurality of processes and such a production schedule that a predetermined number of products can be efficiently machined until the appointed date of delivery. If the machine tool is unexpectedly stopped, therefore, the production possibly must be rescheduled thereafter, and this rescheduling work is time-consuming. Further, some machines incorporated in production lines cannot be easily stopped.

SUMMARY OF THE INVENTION

Accordingly, in view of the problems of the prior art described above, the object of the present invention is to provide a numerical controller for a machine having a component inspection timing notification function capable of properly notifying a user of the timing for component inspection.

A numerical controller for a machine according to the present invention has function of notifying a timing for inspection of at least one of a plurality of components used in the machine. The numerical controller comprises: inspection cycle storage means for storing a plurality of inspection cycles for the component; inspection cycle selecting threshold storage means for storing a first threshold for the selection of an inspection cycle for the component based on an amount of change in state quantity of the component; state quantity storage means for storing inspection dates for the component and state quantities measured on the inspection dates in association with one another; amount-of-change calculation means for calculating the amount of change in state quantity based on at least two inspection dates stored in the state quantity storage means and state quantities measured on the at least two inspection dates; inspection cycle selection means for selecting one of the inspection cycles stored in the inspection cycle storage means by comparing the amount of change in state quantity calculated by the amount-of-change calculation means with the first threshold; next inspection date calculation means for calculating the next inspection date based on the last inspection date for the component and the inspection cycle selected by the inspection cycle selection means; and inspection date notification means for notifying the next inspection date calculated by the next inspection date calculation means.

According to a first embodiment of the invention, the numerical controller for a machine may further comprise: operation schedule acquisition means for acquiring an operation schedule for the machine; inspection candidate date acquisition means for extracting a possible date for component inspection from the operation schedule acquired by the operation schedule acquisition means, thereby acquiring an inspection candidate date; next inspection date selection means for selecting, as the next inspection date, an inspection candidate date nearest and prior to a deadline date for the next inspection, based on the inspection candidate date acquired by the inspection candidate date acquisition means, with the next inspection date calculated by the next inspection date calculation means regarded as the deadline date for the next inspection; and inspection date notification means for notifying the next inspection date selected by the next inspection date selection means.

According to a second embodiment of the invention, the numerical controller for a machine may further comprise: life determining threshold storage means for storing a second threshold for the determination of the life of the component; component life determination means for determining the life of the component by comparing the state quantity measured on the inspection date with the second threshold stored in the life determining threshold storage means; component life notification means for notifying that the component life is exhausted when the component life determination means determines that the component life is exhausted; component replacement information storage means for storing component replacement information indicative of a component replacement when the component notified of exhaustion of the life thereof by the component life notification means is replaced; and replaced-component inspection cycle selection means for selecting the inspection cycle for the replaced component, from the plurality of inspection cycles stored in the inspection cycle storage means, when the component replacement information is stored in the component replacement information storage means.

According to the present invention, there can be provided a numerical controller for a machine having a component inspection timing notification function capable of properly notifying a user of the timing for component inspection so that a component can be inspected more efficiently.

BRIEF DESCRIPTION OF THE DRAWINGS

The above and other objects and features of the present invention will be obvious from the ensuing description of embodiments with reference to the accompanying drawings, in which:

FIG. 8 is a flowchart illustrating processing for selecting a component inspection cycle after component replacement.

DETAILED DESCRIPTION OF THE PREFERRED EMBODIMENTS

In order to solve the aforementioned "first problem", the date of an inspection and state quantities measured during the inspection are stored, in a manner associated with each other, in a memory, and amounts of change in the state quantities are calculated based on these stored data and compared with thresholds. Based on this, one of a plurality of inspection cycles stored in the memory is selected, and a user is notified of the result of calculation of the date of the inspection based on the selected inspection cycle and the date of the last component inspection.

The amount of change in state quantity is an amount corresponding to a rate at which the state quantity changes during a unit period (days, months, or years).

The state quantities include a voltage, insulation resistance value, deformation, frequency, operating time, etc., which correspond to inspection items of each of components that constitute a machine tool. At least one state quantity corresponds to each component. For example, the state quantity of a component A is a voltage, and that of a component B is an insulation resistance value.

In order to solve the "second problem", moreover, a deadline date for the next inspection is calculated based on the selected inspection cycle and the date of the last inspection. At the same time, inspection candidate dates on which the machine tool (hereinafter referred to as "machine") can be stopped for the inspection are acquired from a previously created operation schedule for the machine. Then, an inspection candidate date nearest and prior to the deadline date is selected as the next inspection date, which is notified to the user.

A first example of a component inspection timing notification function performed by a numerical controller according to the present invention will be described with reference to FIGS. 1 and 2.

In inspecting a component, the date of the inspection and measured state quantities are stored, in a manner associated with each other, in the memory. The inspection date and state quantities may be input by the user during the component inspection or automatically stored in the memory as the component is inspected. After the inspection date and state quantities are stored in the memory, the next inspection date is calculated based on the inspection cycle stored in the memory and is notified to the user. The inspection cycle is selected in the following steps.

Figure 1:
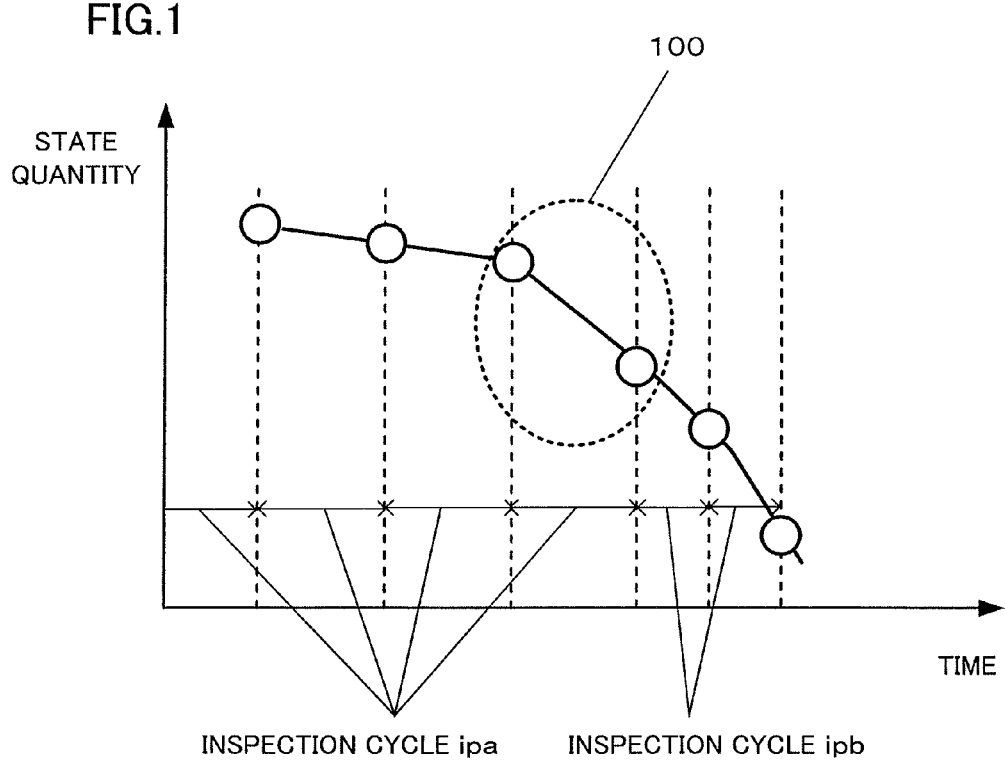
FIG. 1 is a diagram illustrating an example of the change in state quantity measured for inspection of a machine.

FIG. 1 shows an example of the change in state quantity measured for the machine inspection. In FIG. 1, the abscissa and ordinate represent the time and the state quantity, respectively. In this example of FIG. 1, the state quantity gradually changes in a period from the start of use of a component until the time indicated by an ellipse of a broken line 100. However, the state quantity drastically changes in an inspection cycle (represented by small circles of full lines) indicated by the ellipse of the broken line 100, and thereafter, the change in the state quantity becomes greater (with a larger amount of change) than before the inspection cycle indicated by the broken-line ellipse. Thus, it is assumed that the component is inspected in an inspection cycle ipa before the inspection cycles encircled by the ellipse of the broken line 100 and in an inspection cycle ipb (<ipa) shorter than ipa after the inspection cycle indicated by the broken-line ellipse.

In inspecting the component by measuring the state quantity, as shown in FIG. 1, the component inspection can be efficiently performed by varying inspection cycles before and after the inspection cycles encircled by the ellipse of the broken line 100. Specifically, the efficiency of the component inspection can be increased by setting the inspection cycle ipa before the inspection cycle indicated by the broken-line ellipse to be longer than the ipb after the inspection cycle indicated by the broken-line ellipse.

To attain this, the inspection cycles ipa and ipb before and after the inspection cycles encircled by the ellipse of the broken line 100 and a first threshold TH1 for determining the inspection cycle indicated by the broken-line ellipse are previously stored in the memory (storage device of the numerical controller).

The amount of change in state quantity is calculated based on the inspection date and the measurement results of the state quantities stored in the memory. By way of example, the amount of change in state quantity is calculated using equation (1), based on the current inspection date and measured state quantity and the previous inspection date and measured state quantity, as follows:

$$(\text{Amount of change in state quantity}) = \{(\text{State quantity measured this time}) - (\text{State quantity measured last time})\} / \{(\text{Current inspection date}) - (\text{Previous inspection date})\} \quad (1)$$

Figure 2:
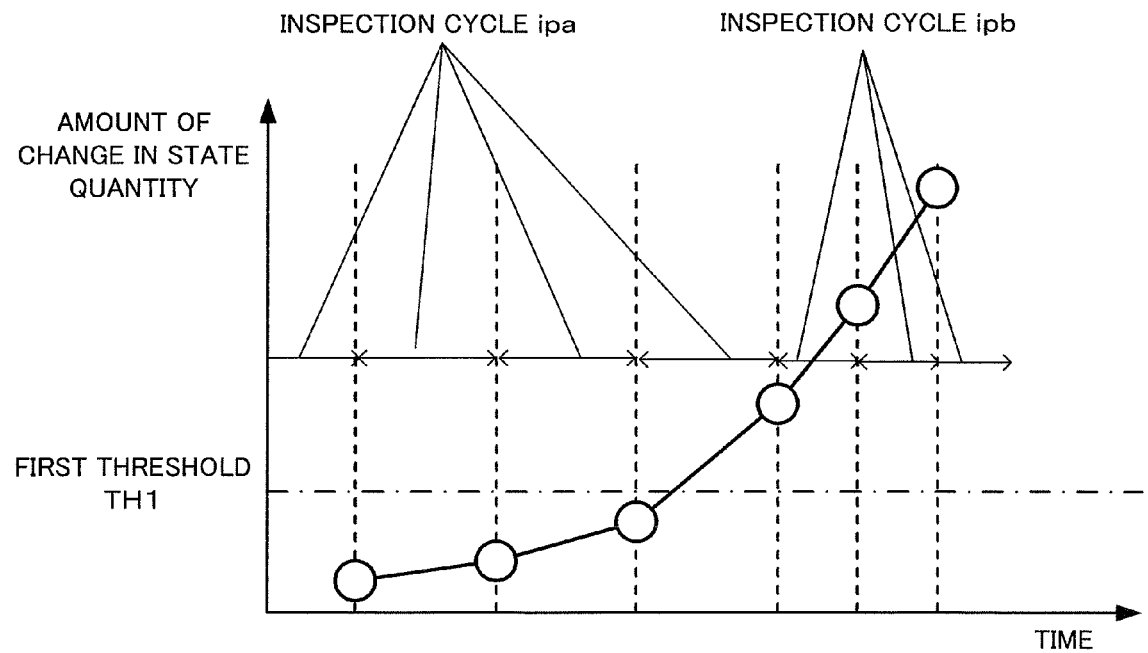
FIG. 2 is a diagram illustrating the amount of change in state quantity.

FIG. 2 is a graph showing an amount of change in state quantity calculated in this manner. The abscissa and ordinate of the graph of FIG. 2 represent the time and the amount of change in state quantity, respectively. It is determined that the time when the first threshold TH1 (stored in the memory) is exceeded by the calculated amount of change in state quantity corresponds to the inspection cycles encircled by the ellipse of the broken line 100, and the next inspection date is calculated using the inspection cycle ipb at that time and thereafter. The user is notified of the calculated next inspection date.

A second example of the component inspection timing notification function performed by the numerical controller according to the present invention will now be described with reference to FIG. 3.

The next inspection date is calculated according to the first example described above. If the machine is expected to be stopped on the calculated inspection date, however, the subsequent operation schedule for the machine possibly must be changed. In the second example, therefore, an inspection date that does not require the operation schedule to be changed is determined in the following steps and notified to the user. The "stopping of the machine" as stated herein results in a state in which the machine tool cannot work, and hence, cannot manufacture products.

The calculated next inspection date is assumed to be a deadline date DT on which the next inspection is to be carried out.

Inspection candidate dates ET on which the machine can be stopped for the inspection are acquired from a previously created operation schedule for the machine stored in the storage device of the numerical controller or external equipment, such as a personal computer.

The inspection candidate dates ET may be provided in advance in creating the operation schedule. In the case where a fixed operation is repeated in a line configuration, the inspection candidate dates ET may be guessed by retrieving and patterning the state in which the machine tool is stopped by, for example, monitoring the speed of a motor.

Figure 3:
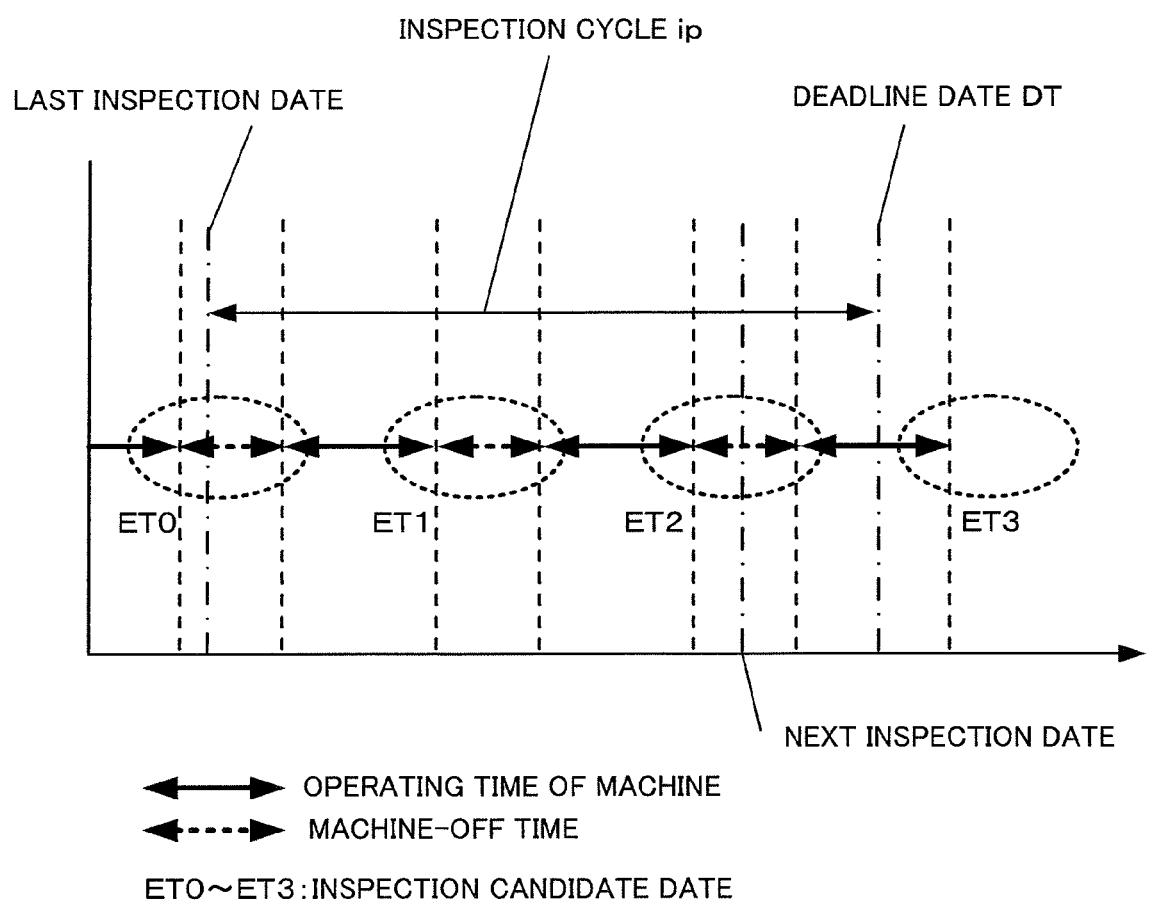
FIG. 3 is a diagram illustrating a method of selecting the next inspection date with reference to an operation schedule of the machine.

FIG. 3 shows a method of selecting the next inspection date with reference to the operation schedule. Among the plurality of acquired inspection candidate dates ET, the inspection candidate date nearest and prior to the deadline date DT is selected and notified as the next inspection date to the user.

Inspection candidate dates ET0 to ET3 on which the machine can be stopped are acquired from the operation schedule for the machine. Of these, the inspection candidate date ET2 nearest and prior to the deadline date DT is selected as the next inspection date. Since the inspection date thus selected is a predetermined date on which the machine is to be stopped, the component inspection can be performed without substantially changing the operation schedule for the machine.

The following is a description of a third example of the component inspection timing notification function performed by the numerical controller according to the present invention.

When the notified inspection date is reached, the user inspects the component. During this inspection, the user compares the measured state quantity with a second threshold TH2 for determining the component life previously stored in the memory, thereby determining whether or not the component life is exhausted (or the expiration date of the component is reached).

If the component life is determined to be exhausted, the user replaces the component with a new one, and at the same time, selects a subsequent inspection cycle. The user may select the inspection cycle for the new component from the inspection cycles stored in the memory (storage device of the numerical controller) by storing the memory with the fact that the component is replaced with the new one or may measure the state quantity of the replaced component and then select the inspection cycle based on the measured value of the state quantity of the replaced component.

The following is a description of the above-described case where the inspection cycle is selected based on the state quantity shown in FIG. 1. In most cases, the replacing component is a brand-new one, so that its state quantity can be considered to be a value obtained before the inspection cycles encircled by the ellipse of the broken line 100. If the history of the component replacement is stored in the memory, therefore, the inspection cycle ipa is selected as the subsequent inspection cycle.

Since the life of most components to be replaced is exhausted, their state quantities are values obtained after the inspection cycles encircled by the ellipse of the broken line 100. Normally, the state quantity changes in only one direction, either increasing or decreasing direction. If the state quantity is greatly changed in the direction opposite to a normal direction, therefore, the component is considered to have been replaced with a new one. In this case, the subsequent inspection cycle is changed. The state quantity, such as the one shown in FIG. 1, is reduced as the component is degraded. If the measured state quantity is greater than its preceding state quantity, therefore, the component is considered to have been replaced, and the inspection cycle ipa is selected as the subsequent inspection cycle.

Figure 4:
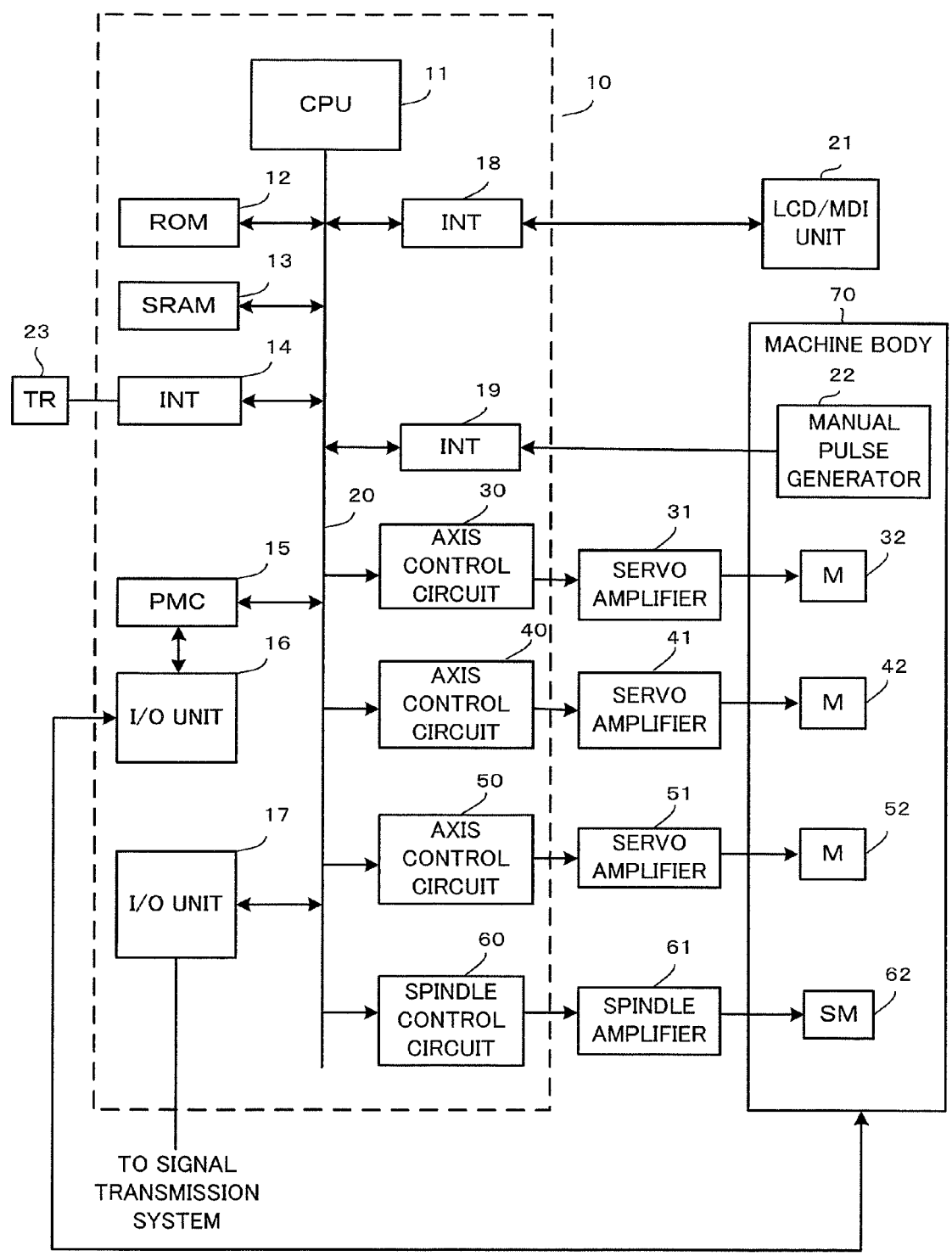
FIG. 4 is a block diagram illustrating a machine tool controlled by a numerical controller.

FIG. 4 shows one embodiment of the controller for a machine having the component inspection timing notification function according to the present invention.

Figure 5:
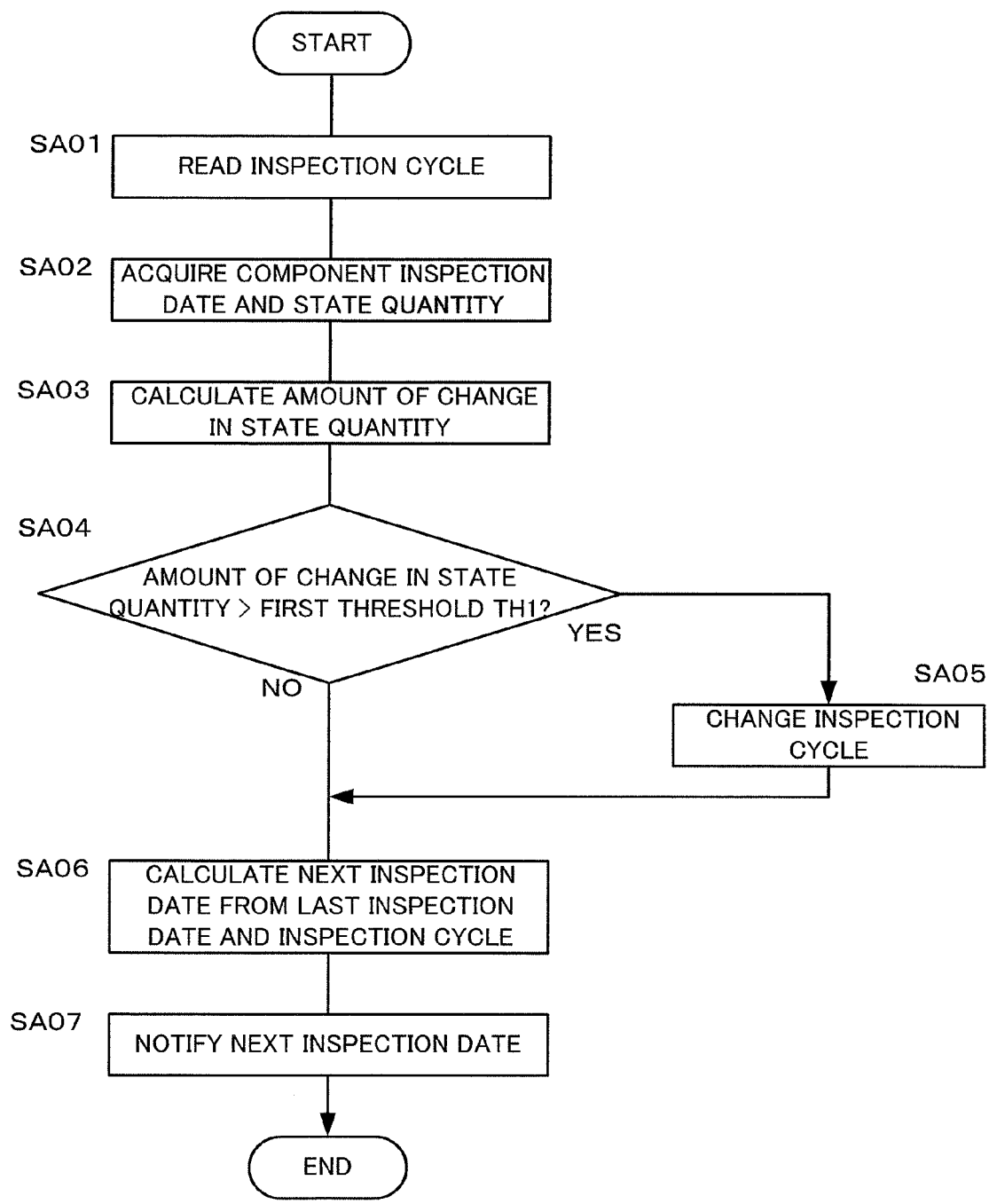
FIG. 5 is a flowchart showing processing for notifying the timing for component inspection.

A numerical controller 10 is a device for controlling a machine body 70 of a machine tool or industrial machine. In the storage device of the numerical controller 10, programs for executing processing shown in the flowchart of FIG. 5 are stored. The numerical controller 10 executes these programs, thereby serving as a controller for the machine tool having the component inspection timing notification function. A processor (CPU) 11 serves to generally control the numerical controller 10. The CPU 11 reads system programs stored in a ROM 12 and generally controls the numerical controller 10 in accordance with the read system programs.

The system programs stored in the ROM 12 include various programs for executing edit mode processing required for creating and editing a machining program and reproduction mode processing for automatic operation. Further, stored in the ROM 12 are programs for detecting an abnormality of the machine body 70 of the machine tool or industrial machine controlled by the numerical controller 10 and transfer programs for executing storage to an SRAM 13 or transfer from the SRAM 13 when an abnormality is detected. In this specification, an industrial machine is also referred to as a machine tool.

The SRAM 13 serves as a nonvolatile memory backed up by a battery (not shown) and has its data area stored with temporary calculation data and various data input by an operator through an LCD/MDI unit 21. Further, machining programs read through an interface 14 and input through the LCD/MDI unit 21 are stored in the SRAM 13. The LCD/MDI unit 21 comprises a display such as a liquid-crystal display and a manual input device such as a keyboard.

The interface 14 is an interface for an external equipment that can be connected to the numerical controller 10. An external device 23, such as input/output means or an external storage device, is connected to the interface 14. The machining programs are read from the external device 23, and the machining program edited in the numerical controller 10 can be output to the external device 23.

A programmable machine controller (PMC) 15 controls auxiliary devices (e.g., an actuator for tool change) on the machine side based on sequential programs in the numerical controller 10. The PMC 15 converts M, S and T functions commanded by, for example, the machining program into signals required on the auxiliary-device side, and outputs the signals to the auxiliary-device side through an I/O unit 16. The auxiliary devices including various actuators are actuated by these output signals.

Image signals, such as the current position of each axis, alarms, parameters, image data, etc., are delivered to the LCD/MDI unit 21 and displayed on the display of the LCD/MDI unit 21.

An interface 18 receives data from the manual data input device of the LCD/MDI unit 21 and delivers them to the CPU 11. Further, the timing for component inspection is displayed on the display of the LCD/MDI unit 21.

An interface 19 is connected to a manual pulse generator 22 and receives pulses from the generator 22. The manual pulse generator 22 is mounted on a control panel of the machine body 70 and is used to precisely position moving parts of the machine tool according to respective-axis control by distribution pulses based on manual operation.

On receiving move commands for respective axes from the CPU 11, axis control circuits 30, 40 and 50 output the commands to servo amplifiers 31, 41 and 51. On receiving these commands, the servo amplifiers 31, 41 and 51 drive servomotors 32, 42 and 52 for the respective axes of the machine tool. In this case, the servomotors 32, 42 and 52 are used to drive X-, Y-, and Z-axes that are linear-motion axes for table movement, respectively.

Detectors (not shown) for position and speed detection are incorporated in the servomotors 32, 42, 52 for the respective axes, and position data from these detectors are fed back to the axis control circuits 30, 40, 50, individually. Speed data can be created by calculating differences between these position data. The resulting position/speed signals are not shown in FIG. 4.

On receiving a spindle rotation command from the CPU 11 to the machine tool, a spindle control circuit 60 outputs a spindle speed command to a spindle amplifier 61. On receiving this spindle speed command, the spindle amplifier 61 rotates a spindle motor 62 at a specified cutting rotational speed for the machine tool. The spindle motor 62 is connected with a position detector by gears or a belt. The position detector outputs feedback pulses in synchronism with the rotation of a spindle, and the feedback pulses are read by the CPU 11 through a bus 20. A configuration associated with these feedback pulses is not shown in FIG. 4. Further, the bus 20 is connected with an I/O unit 17 for signal transfer with a signal transmission line. A network or telephone line is connected to the opposite side of the I/O unit 17.

In storage device (ROM 12 and SRAM 13) in the numerical controller 10 for a machine having the component inspection timing notification function according to the present invention, software that executes processing shown in the following flowcharts and necessary data for performing the software are stored.

Examples of component inspection timing determination processing that correspond to first to third examples of the component inspection timing notification function, respectively, performed by the numerical controller according to the present invention will now be described with reference to the flowcharts.

First, the example of the component inspection timing determination processing corresponding to the first example of the component inspection timing notification function will be described with reference to the flowchart of FIG. 5. The following is a sequential description of various steps of operation.

[Step SA01] The inspection cycle is read.

[Step SA02] The inspection date and the state quantity of the component are read from the memory. Stored in this memory is the date of inspection and the state quantity measured by the inspection in association with each other. The inspection date and the measured state quantity may be manually input in the memory by the user during the inspection or automatically stored in the memory.

[Step SA03] The amount of change in state quantity is calculated based on the data read in Step SA02. This calculation is performed using, for example, equation (1) described before.

[Step SA04] It is determined whether or not the amount of change in state quantity calculated in Step SA03 is larger than the predetermined first threshold TH1. If the calculated amount of change is larger (YES), the program proceeds to Step SA05. If not (NO), the program proceeds to Step SA06.

[Step SA05] The inspection cycle is changed. In measuring the state quantity, such as the one shown in FIG. 1, the inspection cycle is shortened (see FIGS. 1 and 2).

[Step SA06] The next inspection date is calculated based on the last inspection date and the inspection cycle.

[Step SA07] The next inspection date is notified, whereupon this determination processing ends. The notification is performed using the display of the numerical controller or other means that can be recognized by the user.

According to the above-described example of the determination processing for the component inspection timing, the timing for efficient inspection of each individual component used in the machine tool can be specified.

Figure 6:
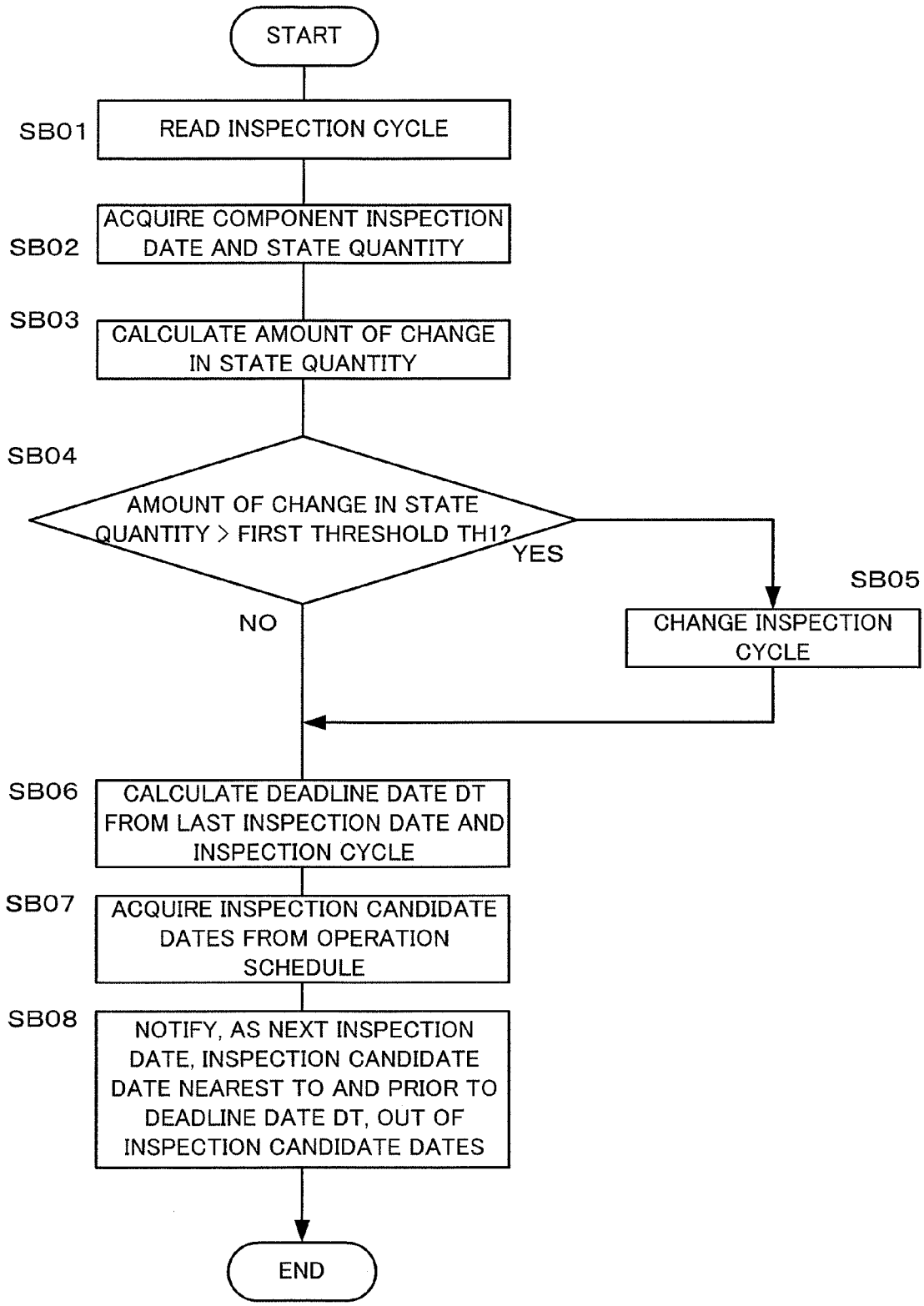
FIG. 6 is a flowchart showing processing for notifying the timing for component inspection in consideration of the operation schedule of the machine.

Next, the example of the component inspection timing determination processing corresponding to the second example of the component inspection timing notification function will be described with reference to the flowchart of FIG. 6. In this example of the determination processing, the component inspection date is notified in consideration of the operation schedule for the machine. The following is a sequential description of various steps of operation.

[Step SB01] The inspection cycle is read.

[Step SB02] The inspection date and the state quantity of the component are read from the memory.

[Step SB03] The amount of change in state quantity is calculated based on the data read in Step SB02.

[Step SB04] It is determined whether or not the amount of change in state quantity calculated in Step SB03 is larger than the predetermined first threshold TH1. If the calculated amount of change is larger (YES), the program proceeds to Step SB05. If not (NO), the program proceeds to Step SB06.

[Step SB05] The inspection cycle is changed.

[Step SB06] The deadline date DT is calculated based on the last inspection date and the inspection cycle.

[Step SB07] Inspection candidate dates are acquired from the operation schedule. The operation schedule for reference is the previously created operation schedule for the machine tool stored in the storage device of the numerical controller or external equipment, such as a personal computer.

[Step SB08] Of the inspection candidate dates acquired in Step SB07, the inspection candidate date nearest and prior to the deadline date DT acquired in Step SB06 is notified as the next inspection date, whereupon this determination processing ends.

Figure 7:
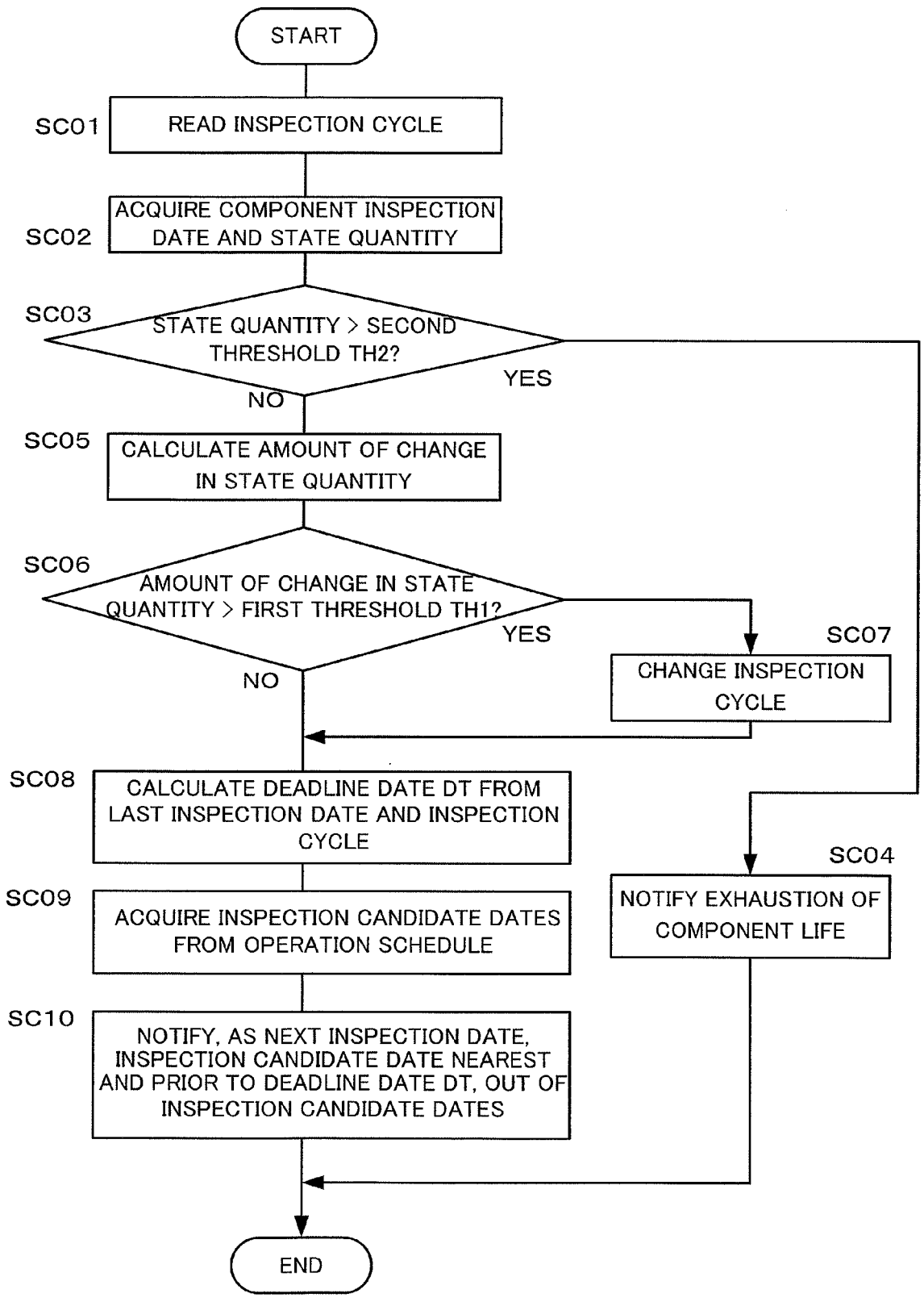
FIG. 7 is a flowchart showing processing for notifying the timing for inspecting a component of the machine having the function of notifying exhaustion of the life of the component.

Next, the example of the component inspection timing determination processing corresponding to the third example of the component inspection timing notification function will be described with reference to the flowchart of FIG. 7. In this example of the determination processing, the timing for machine component inspection is notified. The following is a sequential description of various steps of operation.

[Step SC01] The inspection cycle is read.

[Step SC02] The inspection date and the state quantity of the component are read from the memory.

[Step SC03] It is determined whether or not the state quantity of the component acquired in Step SC02 is larger than the predetermined second threshold TH2. If the acquired state quantity is larger (YES), the program proceeds to Step SC04. If not (NO), the program proceeds to Step SC05.

[Step SC04] Exhaustion of the component life is notified, whereupon this determination processing ends.

[Step SC05] The amount of change in state quantity is calculated based on the data read in Step SC02.

[Step SC06] It is determined whether or not the amount of change in state quantity calculated in Step SC05 is larger than the predetermined first threshold TH1. If the calculated amount of change is larger (YES), the program proceeds to Step SC07. If not (NO), the program proceeds to Step SC08.

[Step SC07] The inspection cycle is changed.

[Step SC08] The deadline date DT is calculated based on the last inspection date and the inspection cycle.

[Step SC09] Inspection candidate dates are acquired from the operation schedule.

[Step SC10] Of the inspection candidate dates acquired in Step SC09, the inspection candidate date nearest and prior to the deadline date DT acquired in Step SC08 is notified as the next inspection date, whereupon this processing ends.

FIG. 8 is a flowchart illustrating processing for selecting the component inspection cycle after component replacement. The following is a sequential description of various steps of operation.

[Step SD01] It is determined whether or not a component replacement flag is set. If the flag is set, the program proceeds to Step SD02. If not (NO), the program ends.

[Step SD02] The inspection cycle after component replacement is read.

[Step SD03] The component replacement flag is turned off, whereupon the processing ends.

The numerical controller is previously provided with means for setting the component replacement flag when the component is replaced by the operator. Alternatively, the numerical controller may be configured so that the component is considered to have been replaced and the component replacement flag is set if the measured state quantity is changed in the direction opposite to the normal direction (or if the state quantity is increased in the case shown in FIG. 1). A memory in which the component replacement flag is stored serves as component replacement information storage means in the numerical controller.

The invention claimed is:

1. A numerical controller for a machine, having function of notifying a timing for inspection of at least one of a plurality of components used in the machine, the numerical controller comprising:
    inspection cycle storage means for storing a plurality of inspection cycles for the component;
    inspection cycle selecting threshold storage means for storing a first threshold for the selection of an inspection cycle for the component based on an amount of change in state quantity of the component;
    state quantity storage means for storing inspection dates for the component and state quantities measured on the inspection dates in association with one another;
    amount-of-change calculation means for calculating the amount of change in state quantity based on at least two inspection dates stored in the state quantity storage means and state quantities measured on the at least two inspection dates;
    inspection cycle selection means for selecting one of the inspection cycles stored in the inspection cycle storage means by comparing the amount of change in state quantity calculated by the amount-of-change calculation means with the first threshold;
    next inspection date calculation means for calculating the next inspection date based on the last inspection date for the component and the inspection cycle selected by the inspection cycle selection means; and
    inspection date notification means for notifying the next inspection date calculated by the next inspection date calculation means.

2. The numerical controller for a machine according to claim 1, further comprising:
    operation schedule acquisition means for acquiring an operation schedule for the machine;
    inspection candidate date acquisition means for extracting a possible date for component inspection from the operation schedule acquired by the operation schedule acquisition means, thereby acquiring an inspection candidate date;
    next inspection date selection means for selecting, as the next inspection date, an inspection candidate date nearest and prior to a deadline date for the next inspection, based on the inspection candidate date acquired by the inspection candidate date acquisition means, with the next inspection date calculated by the next inspection date calculation means regarded as the deadline date for the next inspection; and
    inspection date notification means for notifying the next inspection date selected by the next inspection date selection means.

3. The numerical controller for a machine according to claim 1, further comprising:
    life determining threshold storage means for storing a second threshold for the determination of the life of the component;
    component life determination means for determining the life of the component by comparing the state quantity measured on the inspection date with the second threshold stored in the life determining threshold storage means;
    component life notification means for notifying that the component life is exhausted when the component life determination means determines that the component life is exhausted;
    component replacement information storage means for storing component replacement information indicative of a component replacement when the component notified of exhaustion of the life thereof by the component life notification means is replaced; and replaced-component inspection cycle selection means for selecting the inspection cycle for the replaced component, from the plurality of inspection cycles stored in the inspection cycle storage means, when the component replacement information is stored in the component replacement information storage means.

* * * * *